United States Patent [19]

Hojo et al.

[11] Patent Number: 4,471,665
[45] Date of Patent: Sep. 18, 1984

[54] GYRO APPARATUS

[75] Inventors: Takeshi Hojo; Shinichi Kawada, both of Kuroiso, Japan

[73] Assignee: Kabushiki Kaisha Tokyo Keiki, Tokyo, Japan

[21] Appl. No.: 350,254

[22] Filed: Feb. 19, 1982

[30] Foreign Application Priority Data

Feb. 27, 1981 [JP] Japan .................................. 56-27796

[51] Int. Cl.³ ............................................. G01C 19/20
[52] U.S. Cl. .......................................... 74/5.9; 33/327; 74/5 R
[58] Field of Search ...................... 74/5.9, 5 R; 33/327

[56] References Cited

U.S. PATENT DOCUMENTS

| | | | |
|---|---|---|---|
| 2,650,502 | 9/1953 | Lundberg et al. | 33/327 X |
| 2,854,850 | 10/1958 | Braddon | 74/5 R |
| 2,872,821 | 2/1959 | Derossi | 33/327 X |
| 3,522,736 | 8/1970 | Hojo et al. | 74/5 R |
| 3,596,523 | 8/1971 | Clark | 74/5 R X |
| 3,855,711 | 12/1974 | Kawada et al. | 33/327 |

Primary Examiner—Rodney H. Bonck
Attorney, Agent, or Firm—Hill, Van Santen, Steadman & Simpson

[57] ABSTRACT

A gyro apparatus including a gyro case for housing a gyro therein, the spin axis of which is selected to be substantially horizontal, a container for accommodating therein the gyro case and containing a liquid within it, a first supporting device for supporting the gyro case within the container, a second supporting device for supporting the container in a manner that the container may have the freedom of three axes, and a vertical follow-up device for making the container to follow-up the gryo case around a gravity line, in which there is further provided a device in connection with the container for substantially changing the gap formed between the container containing the liquid and the gyro case from the outside of the container so as to adjust the displacement between the center of gravity of the gryo case and the center of viscous force caused by the liquid acting on the gyro case.

1 Claim, 11 Drawing Figures

GYRO APPARATUS

BACKGROUND OF THE INVENTION

1. Field of the Invention

The present invention relates to an improvement of a prior art gyro apparatus such as disclosed in the Japanese Patent No. 885,730 equivalent to U.S. Pat. No. 3,955,711 by same applicants of the present invention and is directed more particularly to a gyro apparatus which can shorten the time required for adjusting the roll error during manufacturing a gyrocompass.

2. Description of the Prior Art

The prior art gyro apparatus disclosed in the abovementioned Japanese Patent will hereinafter be described with reference to FIGS. 1 to 9.

Figure 1:
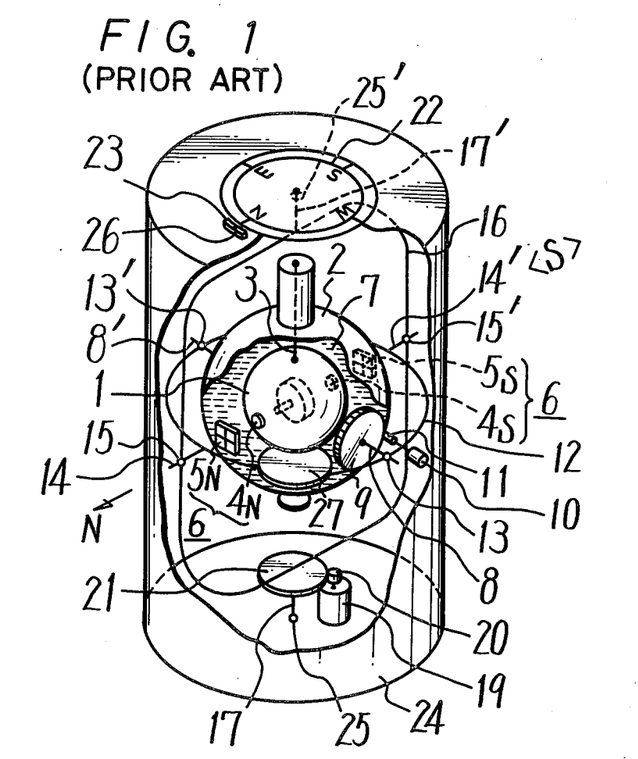
FIG. 1 is a schematic diagram showing an example of a gyro apparatus to which the present invention is applied whose one portion is cut off to see.

In FIG. 1, reference numeral 1 denotes a gyro case for accommodating within it a gyro rotor rotatable at high speed, which is constructed as a liquid-tight structure, 2 a container or receptacle formed like a tank to surround therein the gyro case 1 and 3 denotes a suspension wire for supporting or suspending the gyro case 1, an upper end of which is fixed to the tank 2 and a lower end which is secured to the gyro case 1, respectively.

Numerals 4N, 4S and 5N, 5S each designate primary and secondary sides of a non-contact displacement detection apparatus 6, in which the primary sides 4N and 4S are respectively attached to, for example, intersecting points on an external surface of the gyro case 1 to which a spin axis of the gyro is extended, that is, north and south sides of the gyro, while the secondary sides 5N and 5S are attached to the positions responsive to the primary sides 4N and 4S on the tank 2. Numeral 7 represents a liquid or oil like a damping oil with high viscosity, which is charged or sealed into the tank 2. At the positions (east and west) perpendicular to the spin axis of the gyro on the equator of the tank 2 are located ends of a pair of horizontal shafts 8 and 8' and the other ends rotatably engage bearings 13 and 13' provided at the positions corresponding to a horizontal ring 12. Numeral 10 denotes a horizontal follow-up servo motor, which is attached to the horizontal ring 12. To one horizontal shaft 8 is attached a horizontal gear 9 arranged to be rotatably meshed with a horizontal pinion 11 fixed to the rotary shaft of the servo motor 10. At positions perpendicular to the horizontal shaft bearings 13 and 13' mentioned previously in the horizontal ring 12 are attached gimbal shafts 14 and 14', which are rotatably engaged with gimbal shaft bearings 15 and 15' placed at the corresponding position on a follow-up ring 16. At the top and bottom of the follow-up ring 16 are located follow-up shafts 17 and 17', free end portions of which are rotatably engaged with follow-up shaft bearings 25 and 25' provided at the positions illustrated in binnacle 24. An azimuth gear 21 is attached to one follow-up shaft 17. Anb azimuth follow-up servo motor 19 is installed on the binnacle 24 and an azimuth pinion 20 is attached to the rotary shaft thereof, which rotatably meshes with the azimuth gear 21. Numeral 22 designates a compass card which is secured to the follow-up shaft 17'. Numeral 23 represents a lubber line plate or board attached to the upper plane of the binnacle 24 in such a manner as to correspond to the compass card 22 where the course of a ship or vehicle equipped with the gyro apparatus according to this embodiment is read out by the cooperation of a lubber line 26 drawn on the central portion thereof and the compass card 22. In this case, as shown in FIG. 1, reference numeral 27 represents a saucer or dish-shaped portion or member, which is the main or essential part of the present invention and its description in detail will be presented later.

Figure 2:
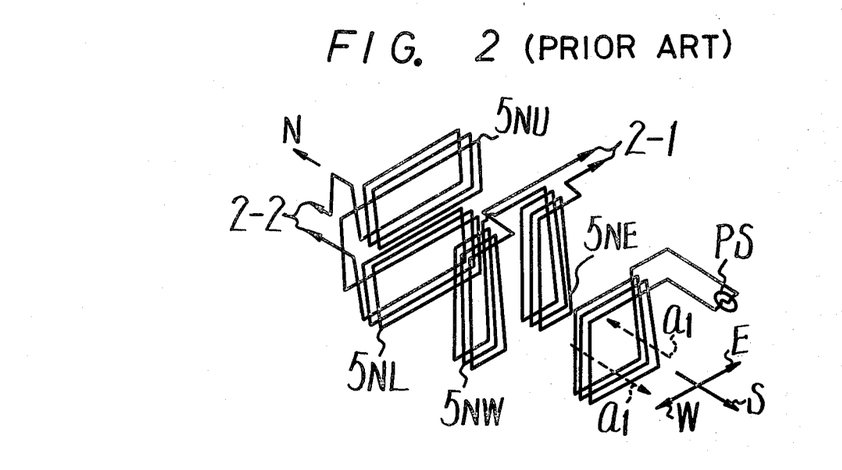
FIG. 2 is a schematic diagram showing an example of the detection apparatus thereof.

Next, one practical example of the aforesaid non-contact displacement detection apparatus 6 will be described with reference to FIGS. 2 and 3. FIG. 2 describes a case in which a pair of N (north) sides are taken out. As shown in the figure, the primary side 4N is formed of a single primary rectangular coil whose winding is in the plane perpendicular to the spin axis of the gyro, which is ordinarily energized by the alternating current commonly used for a gyro power supply PS thereby to form AC magnetic fields respectively illustrated by broken arrows $a_1$ and $a_1$. The secondary side 5N is likewise comprised of four rectangular coils 5NW, 5NE, 5NU and 5NL in which a pair of coils 5NW and 5NE are arranged in parallel in the horizontal direction and another pair of coils 5NL and 5NU are arranged in the vertical direction. The pairs of coils 5NW, 5NE and 5NU, 5NL are connected to each other at the portions where the windings start.

Now, let us consider a case wherein the primary side coil 4N, namely, the gyro case 1 is positioned in the center of the secondary side coil 5N, namely, the tank 2. Since the magnetic flux oriented from the primary coil 4N passes through the four secondary coils 5NW, 5NE, 5NU and 5NL, voltages are correspondingly induced in the respective four coils. But, since the magnetic flux changes in the respective secondary coils each are approximately the same and in addition, the pairs of coils each are differentially coupled to one other as depicted above, no voltages are produced across their output terminals 2-1 and 2—2. Also, let us consider another case, for example, in which the primary coil 4N is displaced toward the east (shown by arrow E in FIG. 2), the magnetic flux passing through the coil 5NE is increased while the magnetic flux passing through the coil 5NW is decreased, so that a voltage is produced across the output terminal 2-1, but no voltage is produced across the other output terminal 2—1.

On the other hand, when the primary coil 4N is displaced toward the west (shown by arrow W in FIG. 2), contrary to the above case, the induced voltage in the coil 5NW is increased but, the induced voltage in the coil 5NE is decreased thereby to produce a voltage with the phase opposite to that produced when the primary coil 4N is displaced toward the east. In this case, the coils 5NU and 5NL are located in the vertical direction, so that no voltage is produced across the output terminal 2—2 thereof, which is the same as set forth above.

On the other hand, with respect to the displacement in the vertical direction of the primary coil 4N, since no voltage is produced in the coils 5NW and 5NE which are disposed in the horizontal direction, but the voltages are produced in the coils 5NL and 5NU placed in the vertical direction, output voltage is generated across the output terminal 2—2 thereof. In other words, by the construction shown in FIG. 2, it is possible that the displacement of the N end of the gyro case 1 in the east-west and vertical directions relative to the tank 2 can be detected.

Figure 3:
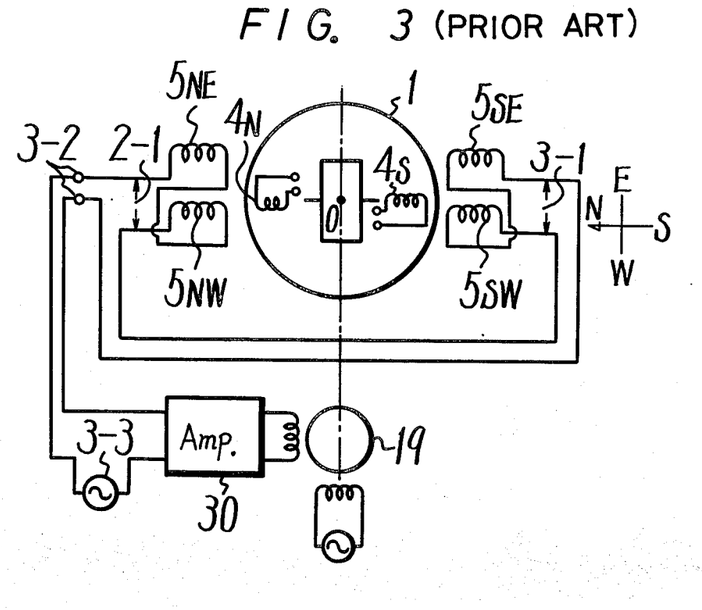
FIGS. 3 and 4 are schematic diagrams of the follow-up system of the detection apparatus.

FIG. 3 is an arrangement representing schematically a detection apparatus for detecting the displacement in only the east-west direction wherein the gyro case 1 is viewed from the top thereof. More specifically, the displacement detection apparatus in the S (south) side is comprised of a primary side coil 4S, secondary side coils 5SE and 5SW wherein when the gyro case 1 is displaced in the east direction, the magnetic flux which passes through the coil 5SE is increased, but the magnetic flux in the coil 5SW is decreased to thereby induce a voltage across terminal 3-1, the phase of which is the same as that of the voltage produced across the terminal 2-1 of the coils 5NW and 5NE mentioned above. Also, since the coils 5SE, 5SW and 5NE, 5NW are differentially connected to one other, although no voltage is generated across a terminal 3-2 relative to the displacement of the east to west direction of the gyro case 1, when the gyro case 1 produces an angular displacement around a vertical axis line O (perpendicular to the sheet of the drawing), across the terminal 3-2 there is produced an output voltage whose phase is inverted by 180° in accordance with the rotational direction thereof. This output voltage is applied to a control winding of the azimuth servo motor 19 through (or not through) a servo amplifier 30. The rotation of the servo motor 19 is transmitted to the tank 2 by means of the azimuth pinion 20, the azimuth gear 21, the follow-up ring 16 and the horizontal ring 12, so that the tank 2 is controlled to allow the angular displacement around the aforedescribed vertical axis line O to be made zero. In other words, whatever azimuth the gyro case 1 may take, no twisting force is caused at all upon the suspension wire 3 on account of the action of the servo system as mentioned above, which prevents any kind of external disturbance torque to be applied to the gyro at its vertical axis line O. In this case, as illustrated in FIG. 3, numeral 3—3 designates an error correcting signal generating apparatus which is provided for generating the voltage responsive to the speed of a ship or for the latitude, so that the follow-up position of the azimuth follow-up system is displaced and the suspension wire 3 is twisted whereby the torque is applied to the gyro around its vertical axis line O so as to correct the error.

Figure 4:
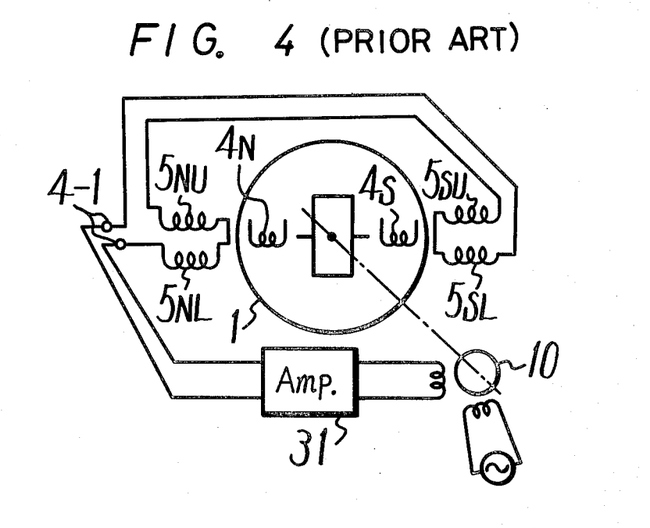

FIG. 4 schematically shows the horizontal follow-up system of the prior art in which the coils 5NU, 5NL and 5SU, 5SL each composing the secondary pick up 5N and 5S are connected to one another differentially in the same manner as described before. For this reason, although across its terminal 4-1 there is produced no output voltage when the gyro case 1 is moved parallel to the vertical direction of the tank 2, a voltagbe is produced across the terminal 4-1 with respect to the angular movement of the gyro case 1 around the horizontal axis, which is applied to the control winding of the horizontal follow-up servo motor 10 through (or not through) a servo amplifier 31. The rotation of the horizontal follow-up servo motor 10 is transmitted to rotate the tank 2 through the horizontal pinion 11 and the horizontal gear 9, so that the angular displacement of the tank 2 as set forth above is made zero.

Figures 5, 6:
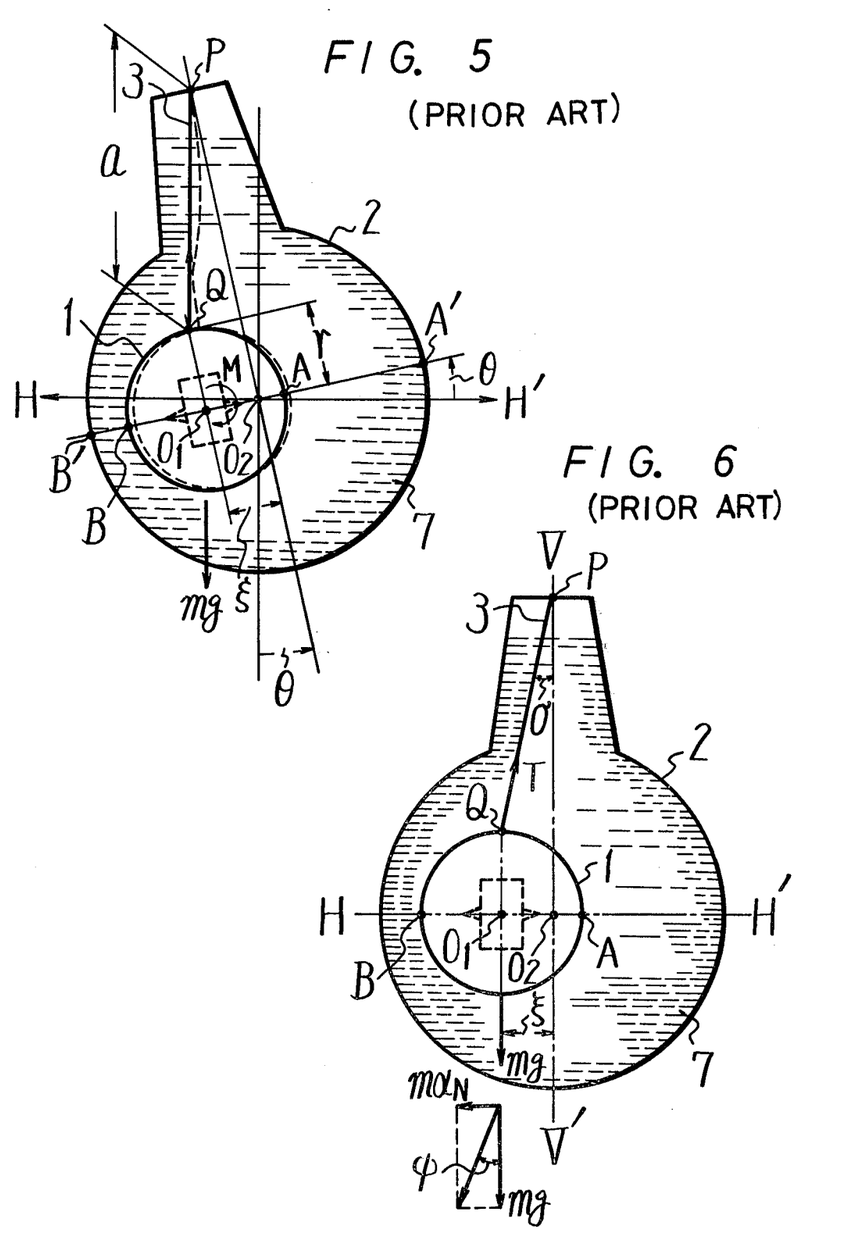
FIGS. 5 and 6 are explanatory diagrams useful for explaining the principle thereof.

FIG. 5 is a representation schematically showing the inside of the tank 2 wherein a north-seeking end A on the extended line of the spin axis of the gyro within the gyro case 1 (which exists on the gyro case 1) is raised higher only by the angle $\theta$ relative to a horizontal plane H—H'. In this case, $O_1$ designates the center of gravity of the gyro case 1, Q designates the coupling point of suspension wire 3 and the tank 2, P, the coupling point of suspension wire 3 and the tank 2. $O_2$, the center of the tank 2 and when the spin axis of the rotor within the gyro case 1 is horizontal ($\theta=0$), $O_1$ and $O_2$ are arranged to be coincident with one other. Also, if reference letter A is given as the north-seeking end and B is given as a point on the gyro case 1 which deviate by 180° from the north-seeking end A, letters A' and B' each represent the points on the tank 2 corresponding to the aforesaid A and B. Then, since the suspension wire 3 presents a deflection curve as shown by a chain line in FIG. 5 due to the fact that the suspension wire 3 has a flexural rigidity in practice, it is natural that axial direction movement $\xi$ ($O_2$ to $O_1$) of the gyro case 1 against the tank 2 ought to be reduced by an extremely small amount. But, such influence is quite small in the practical application, so that the description of this embodiment will be given assuming that the suspensin wire 3 is perfectly flexible.

As previously described, since the points A' and B' on the tank 2 and the points A and B on the gyro case 1 are always arranged on a straight line due to the action of the servo system, the tank 2 is urged to be inclined only by the angle $\theta$ relative to the horizontal plane H—H' in a manner which is same as the gyro case 1. Now, assuming that no external acceleration is applied thereto, since no external force is active for the spin axis direction of the gyro case 1, the suspension wire 3 is coincided with the vertical line. If the tension of the suspension wire 3 is represented by T and the remaining weight of the gyro case 1 excluding the buoyancy caused by the damping oil 7 within the gyro case 1 is represented by mg, the tension T of the suspension wire 3 produces a moment M around the point $O_1$, which can be expressed as follows.

$M = Tr \sin\theta = mg \, r \sin\theta$

This moment M is applied around the horizontal axis (which passes through the point $O_1$ and perpendicular to the sheet of the drawing) of the gyro as the torque thereof. In this case, as illustrated in FIG. 5, reference letter r represents the distance between the center of gravity $O_1$ of the gyro case 1 and the coupling point Q of the suspension wire 3 with the gyro case 1. In other words, according to the method thus discussed, since the torque in proportion to the inclination of the spin axis against the horizontal plane can be applied around the horizontal axis of the gyro and if the distance r, the remaining weight mg and the angular momentum of the gyro are properly selected so as to make the period of the north-seeking movement thereof several tens to one hundred and several tens of minutes, it is possible to produce a gyrocompass as intended. Practically, on account of the flexural rigidity of the suspension wire 3, the preceding description is considered as equivalent to that the afore-described distance r is lengthened to be slightly longer than the practical distance between $O_1$ and Q. Also, the north-seeking apparatus of the gyrocompass is, at the same time, required to have such a characteristic so that rolling errors or scors by errors are not caused by the periodical horizontal acceleration, for example, rolling and pitching jof the ship body and so on, namely, a so-called high cut characteristic (low pass characteristic).

Figures 7, 8, 9:
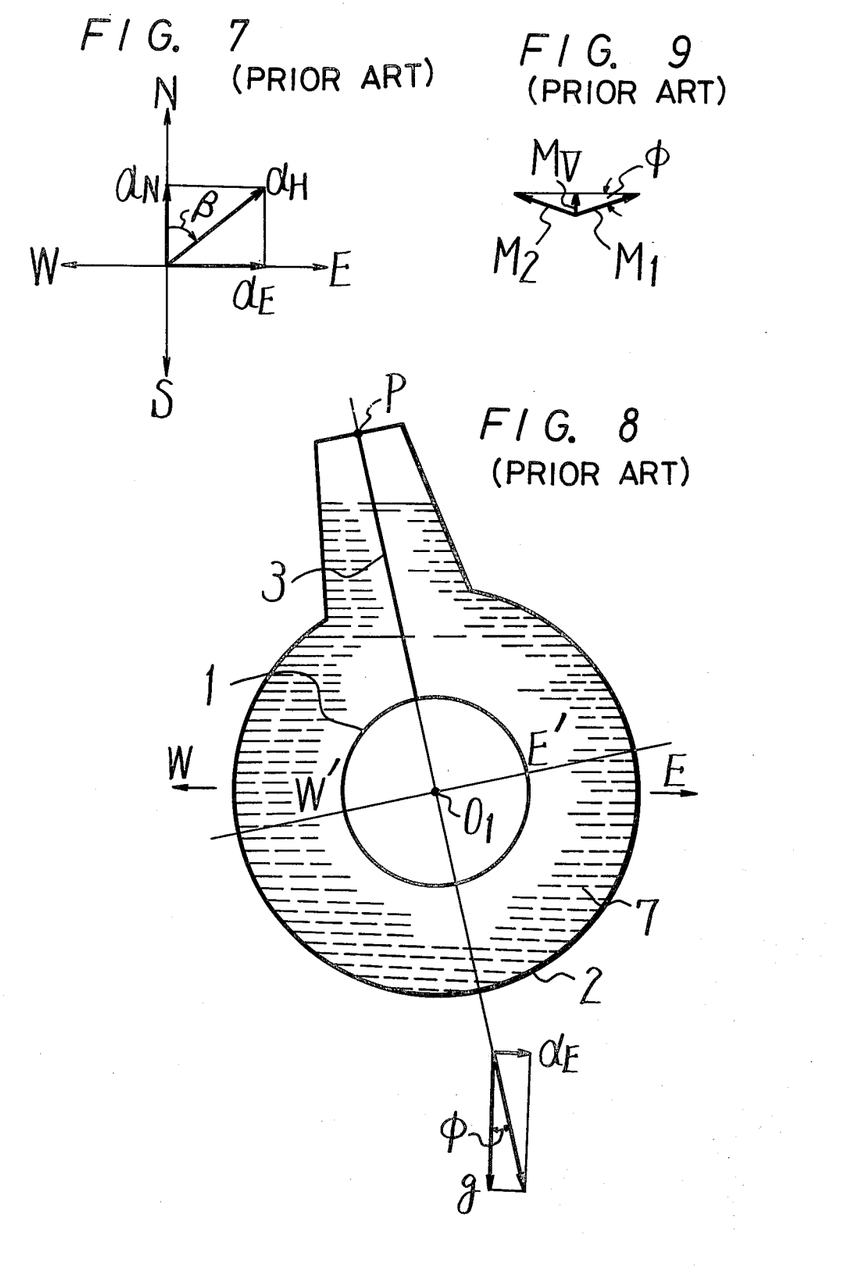
FIG. 7 is a graph used to explain the rolling acceleration.
FIGS. 8 and 9 are explanatory diagrams used to explain the rolling error.

FIG. 6 is a schematic representation taken along the westward side showing a case in which the horizontal acceleration $\alpha H$ acts on the gyro in the stationary state, wherein the spin axis line A–B of the gyro within the gyro case 1 is made substantially to be coincident with a horizontal plane H—H' and a meridian NS. The horizontal acceleration $\alpha H$ is generally brought about by the rolling or pitching motion of the ship and so forth and the magnitude and direction thereof change like sine wave with respect to time and the north to south and east to west components are respectively denoted by $\alpha N$ and $\alpha E$ as seen in FIG. 7.

Now, referring back to FIG. 6, as case is considered where the horizontal acceleration $\alpha H$ may change over extremely long periods. The gyro case 1 follows the north to south acceleration $\alpha N$ with fidelity in a fashion so as to perform sine wave movement within the tank 2, so that an angle $\sigma$ of the suspension wire 3 against the vertical line V—V' may always be coincident with an angle $\Psi$ formed by the horizontal acceleration $\alpha H$ relative to the gravity acceleration g. In this case, as described before, the tension T of the suspension wire 3 forms and applys the torque M, which is expressed as follows around the horizontal axis (which passed through $O_1$ and perpendicular to the sheet of the drawing) of the gyro.

$$M = Tr \sin\sigma \approx Tr \sin\Psi \approx mg \, r \, \alpha(N/g) = mr \, \alpha N$$

This equation means that such change does not cause any compass errors, because the $\alpha N$ is only displaced periodically with respect to time.

FIG. 8 is a schematic representation viewed from the south side for showing a case in which the gyro is applied with the horizontal acceleration $\alpha H$. The tank 2 is of a physical pendulum construction whose underside is heavy around the gimbal shafts 14 and 14' as shown in FIG. 1. Also, since the period of this pendulum normally is one or two seconds and is sufficiently short as compared with the ship's pitching or rolling period, the periodic motion of the suspension wire 3 and the tank 2 are likewise made coincident with each other in a composite direction of the east to west acceleration $\alpha E$ and the gravity acceleration g. As a result, a horizontal axis W'—E' is urged to repeat the inclination movement. In other words, when $\alpha H$ is in the NE quadrant as shown in FIG. 7, a torque represented by $M_1$ as seen in FIG. 9 acts on the gyro and when the $\alpha H$ is in the WS quadrant as shown in FIG. 7, a torque represented by $M_2$ seen in FIG. 9 is applied to the gyro. Accordingly, a torque denoted by $M_v$ seen in FIG. 9 is left around the vertical axis, thus resulting in the azimuth error to the gyro (rolling error).

By the way, the period of the rolling acceleration lasts for about several seconds to twenty seconds practically in most ships now existing and the gyro case 1 and the suspension wire 3 comprise one simple pendulum relative to the N-S direction as previously described, so that the gyro case 1 can not respond to the horizontal acceleration with a period faster than the free period of the aforesaid pendulum system. In addition, it should be noted that by the viscous resistance of the damping oil 7 against the gyro case 1, the gyro case 1 is extremely limited to move in the N-S direction relative to the tank 2. In this case, the center of the viscous force action on the hyro case 1 is adapted to be coincided with the center of the gravity $O_1$. For this reason, against the periodical horizontal acceleration $\alpha N$ which may ordinarily be caused by the ship's rolling, the gyro case 1 and the tank 2 are moved nearly like unitary bodies (in other words, $O_2$ is made coincident with $O_1$) thereby to allow the angle $\sigma$ as seen in FIG. 6 to be made almost zero, and the tension T of the suspension wire 3 will not form a moment around the horizontal axis $O_1$, so that the so-called rolling error will not occur. In this case, it is possible that the viscosity due to the damping oil 7 is selected so as not to substantially influence the long period acceleration such as the north-seeking period of the gyrocompass (for example, about 84 minutes), which does not interfere with the north-seeking movement thereof.

By the way, in accordance with the descriptions thus made, the center of the gravity $O_1$ of the gyro case 1 upon being subjected to the acceleration and the center of viscous force O' due to the damping oil 7 have been treated as if they are approximately coincident with one other. However, to study them more in detail, it is understandable that they are not always coincident with each other.

Figures 10, 11:
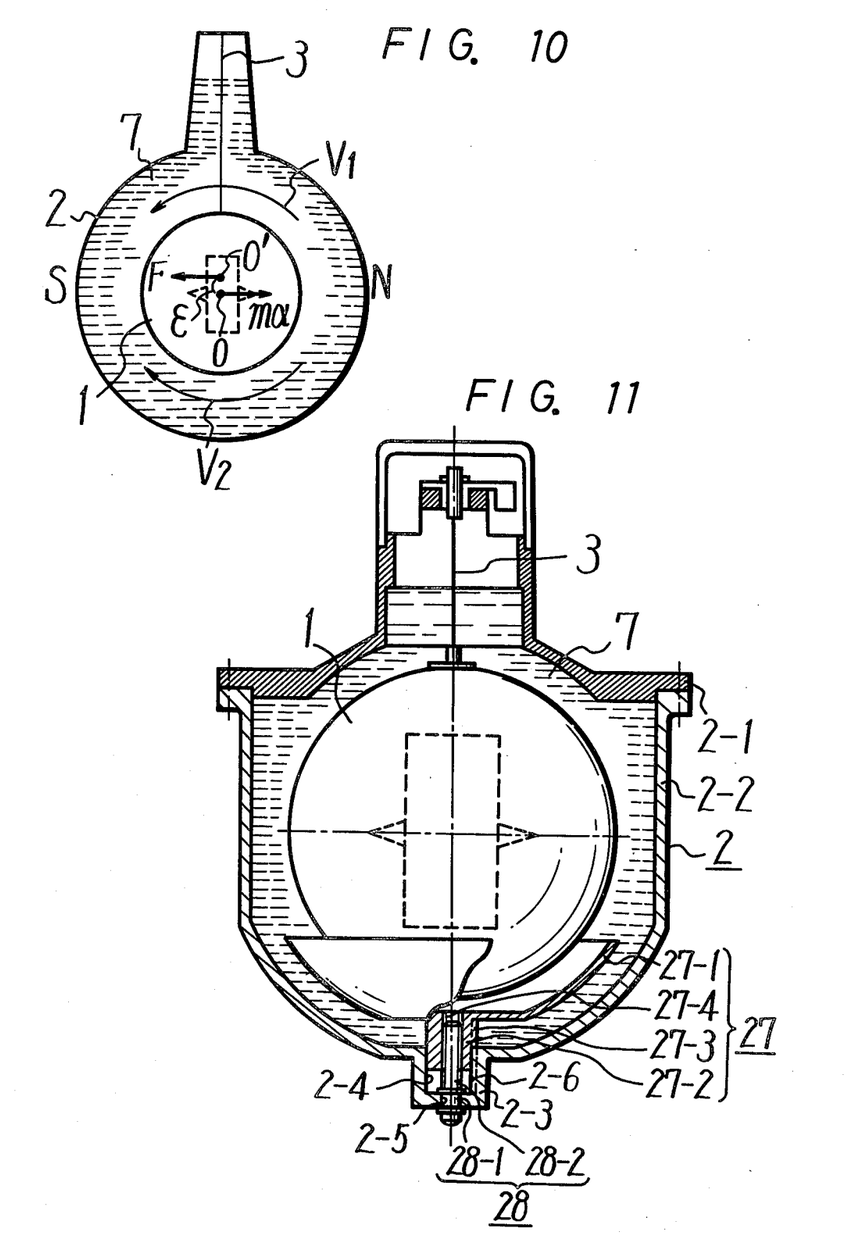
FIG. 10 is a schematic diagram useful for explaining the relation between the center of viscous force caused by a damping oil to work for a gyro case and the center of gravity of the gyro case.
FIG. 11 is a partial cross-sectional diagram mainly showing an essential part of the example according to the present invention.

Now, there is illustrated in FIG. 10 the relationship between the forces working for the gyro case 1 during its acceleration movement. At this time, letting the horizontal acceleration be represented by $\alpha$, for the center of the gravity O of the gyro case 1 there is a force of inertia given as $m\alpha$ shown by a right-hand arrow in the figure. This force of inertia is applied to the damping oil 7 to cause flow represented by $V_1$ and $V_2$ in the upper and lower gaps of the damping oil 7 formed by the tank 2 and the gyro case 1, whereby the viscous force F due to this flow $V_1$ and $V_2$ causes the center of the viscous force O' so as to be balanced with the force of inertia $m\alpha$ as described above.

If the aforesaid upper and lower gaps in the damping oil 7 are perfectly equal to each other, the external periphery of the gyro case 1 and the inner periphery of the tank 2 are formed as true spherical-shapes and the center of the gravity O is correctly made coincident with the center of the gyro case 1, the center of the viscous force O' and the center of the gravity O are made coincident with one other and then undesirable influences not will be exerted thereon. But, in practice, since the afore-said upper and lower gaps can not be made to be the same and the external periphery of the gyro case 1 and the circumferential shape of the tank 2 are not constructed to be true spheres, it is normal, as illustrated in FIG. 10 that the center of the gravity O of the gyro case 1 is generally spaced apart by $\epsilon$ from the center of the viscous force O' working on the gyro case 1 due to the camping oil 7 which has high viscosity. As shown in FIG. 7, when the horizontal acceleration $\alpha$ works for the gyro case 1 from the true North N to the direction formed by angle $\beta$, the tank 2 is angularly displaced by the angle denoted as $\phi$ around its north-south axis as shown in FIG. 8 and at the same time, a torque $m\epsilon r$ caused by the displacement between the center of the gravity O and the center of the viscous force O' works around the east-west axis of the gyro case 1, so that a rectifying action of the torque is brought about by the mechanism the same as seen in FIG. 9 thereby producing the rolling error caused by the fact that the center of the gravity is not coincident with the center of the viscous force, which is peculiar to the gyro apparatus described in the Japanese Patent forth above. When the gyro apparatus is to be adjusted (adjustment of the gyro apparatus where the AC horizontal accelerating is applied in order to permit the rolling error to be reduced to zero is termed as a swing test), it becomes indispensable in practice to make the center of the gravity perfectly coincident with the center of the viscous force.

This rolling error is caused by the fact that the center of the gravity and the center of the viscous force are spaced apart from each other in the upper and lower directions as mentioned above. To cope with the above aspect, various methods have been considered, for example, as will be described later.

(i) To attach weights to the upper and lower sides of the gyro case 1, its center of gravity O is made coincident with the center of the viscous force O';

(ii) To attach fins with specific gravity which is the same as that of the gyro case 1 to the upper and lower sides of the gyro case 1, the center of the viscous force O' is made coincident with the center of the gravity O of the gyro case 1; and (iii) To adjust the length of the suspension wire 3, (the vertical positions) of the gyro case 1 relative to the tank 2 are adjusted then to change the upper and lower gaps as mentioned above, and the center of the viscous force O' is made coincident with the center of the gravity O of the gyro case 1.

In accordance with the methods (i) and (ii) mentioned above, it is necessary to take the gyro case 1 out from the damping oil 7 with high viscosity at every adjusting procedure of the gyro apparatus and hence these methods are not suitable for practical use. Although method (iii) does not have the defects described above, there is a difficulty because the length of the suspension wire 3 must be changed while no twisting is applied thereto. Or, if the upper and lower positions of the gyro case 1 to the tank 2 are altered, there will be caused a zero positions error or the like in displacement detection apparatus. Thus, the method (iii) is also not suitable for practical use.

OBJECTS AND SUMMARY OF THE INVENTION

Accordingly, it is an object of the present invention to provide a novel gyro apparatus which can easily make the center of gravity of a gyro case coincident with the center of viscous force.

It is another object of the present invention to provide a gyro apparatus which is capable of greatly shortening the time required for adjusting the gyro apparatus and which can make a large contribution to reducing the total cost during manufacturing the gyro apparatus.

According to an aspect of the present invention, there is provided a gyro apparatus including a gyro case for housing a gyro therein, the spin axis of which is selected to be substantially horizontal, a container for accommodating therein the gyro case and containing a liquid within it, a first supporting device for supporting the gyro case within the container, a second supporting device for supporting the container in a manner such that the container may have freedom of three axes, and a vertical follow-up device for making the container to follow the gyro case around the gravity line, in which there is further provided a device in connection with the container for substantially changing the gap formed between the container containing the liquid and the gyro case from the outside of the container so as to adjust the displacement between the center of gravity of the gyro case and the center of viscous force caused by the liquid acting on the gyro case.

The other objects, features and advantages of the present invention will become apparent from the following description taken in conjunction with the accompanying drawings through which the like references designate the same elements and parts.

DESCRIPTION OF THE PREFERRED EMBODIMENT

One embodiment of the gyro apparatus according to the present invention will hereinafter be described with reference to FIG. 11 which shows only the main part thereof for simplicity. Like parts and references in FIG. 11 corresponding to those seen in FIG. 1 and are marked with the same numerals.

In one example of the present invention as illustrated in FIG. 11, the tank 2 comprises upper and lower containers 2-1 and 2—2. The lower container 2—2 includes a cylindrical convex portion or member 2-3 at its central portion at its underside. This cylindrical convex portion 2-3 has apertures 2-4 and 2-5 and a key-shaped convex portion or member 2-6. The dish-shaped member 27 previously described is provided with a dish portion or member 27-1, a boss 27-2, a key groove 27-3 and screw portion or internal thread 27-4 formed on the boss 27-2, which are adapted to be respectively engaged with the aperture 2-4, the key-shaped convex portion 2-6 and so on in the lower container 2—2 as described above.

In this case, the engagement of the key-shaped convex portion 2-6 with the key groove 27-3 serves to prevent the dish-shaped member 27 from rotating about the vertical axis when the screw member 28 is rotated.

Also, as shown in FIG. 11, reference numeral 28 designates a screw member which is rotatably engaged with the aperture 2-5 of the lower container 2—2 at its journal portion 28-1 and at the same time, a screw or external thread 28-2 in this screw member 28 is screwed into the screw portion 27-4 of the afore-described or dish-shaped member 27.

In accordance with the gyro apparatus of the present invention mentioned above, in case of the swing test (adjusting rolling error), the screw member 28 is rotated and hence the dish-shaped member 27 is moved up and down to allow the gap formed between the dish-shaped member 27 and the gyro case 1 to be changed, in response to the azimuth error (rolling error) caused by the sinusoidal horizontal acceleration which is applied by a testing apparatus, so that flows of the clamping oil 7 in the upper and lower gaps of the gyro case 1 are changed thereby to make it easy to coincident the center of the viscous force O' with the center O of the gravity of the gyro case 1.

Though not shown, various supporting or suspending devices and so on for the tank 2, which should be used in the embodiment according to the present invention shown in FIG. 11 are the same as those shown in FIG. 1.

The swing test of the gyrocompass is regarded as a task procedure requiring skill and much time wherein a serial process of compass starting, settling, swing or rolling and adjusting procedure are repeatedly carried out several times. But, according to the present invention, it becomes unnecessary, for example, to take out the gyro case 1 from the damping oil 7 so as to exchange the weight and so forth and since the tank 2 is supported or suspended by the servo system, it is possible to move the dish-shaped member up and down, in other words, to achieve the swing adjustment even in a state when the system is operating, so that a gyro apparatus according to the present invention greatly shorten the time required for adjusting the gyro apparatus and makes a large contribution to reducing the total cost of manufacturing the gyro apparatus.

While in the embodiment according to the present invention as shown in FIG. 11, the shape of the dish portion 27-1 is formed as a spherical shell, it is not necessary that the dish portion 27-1 be limited to such shape. But, in short, any shape may be taken if it can change the gap between the gyro case 1 and the lower container 2—2.

The above description is given for a single preferred embodiment of the invnetion, but it will be apparent that many modifications and variations could be effected by one skilled in the art without departing from the spirit or scope of the novel concepts of the invention, so that the scope of the invention should be determined by the appended claims only.

We claim as our invention:

1. A gyro apparatus comprising: a gyro case for housing therein a gyro in such a manner that its spin axis is selected to be substantially horizontal; a container for supporting therein said gyro case and containing a liquid within it; first supporting means for supporting said gyro case within said container; second supporting means for supporting said container with freedom of three axes; a vertical follow-up means for causing said container to follow-up said gyro case around a gravity line; means provided in connection with said container for substantially changing a gap formed between said container and said gyro case from the outside of said container whereby a displacement between a center of gravity of said gyro case and a center of viscous force caused by said liquid acting on said gyro case can be adjusted, said last-mentioned means consisting of a dish-shaped member and a screw member which is coupled at its one end to said dish-shaped member and at its other end rotatably supported by said container; and preventing means for preventing said dish-shaped member from being rotated; said dish-shaped member comprising a boss, a key groove formed on said boss and an internal thread formed on said boss, said container comprising a first aperture in which said boss is inserted, a second aperture and a key member which is engaged with said key groove, said screw member comprising a journal portion and an external thread which is screwed into said internal thread, said journal portion being engaged with said second aperture, and said key member and said key groove forming said preventing means.

* * * * *